(No Model.)
C. M. FOWLER.
RAISIN SEEDER.
No. 538,905. Patented May 7, 1895.
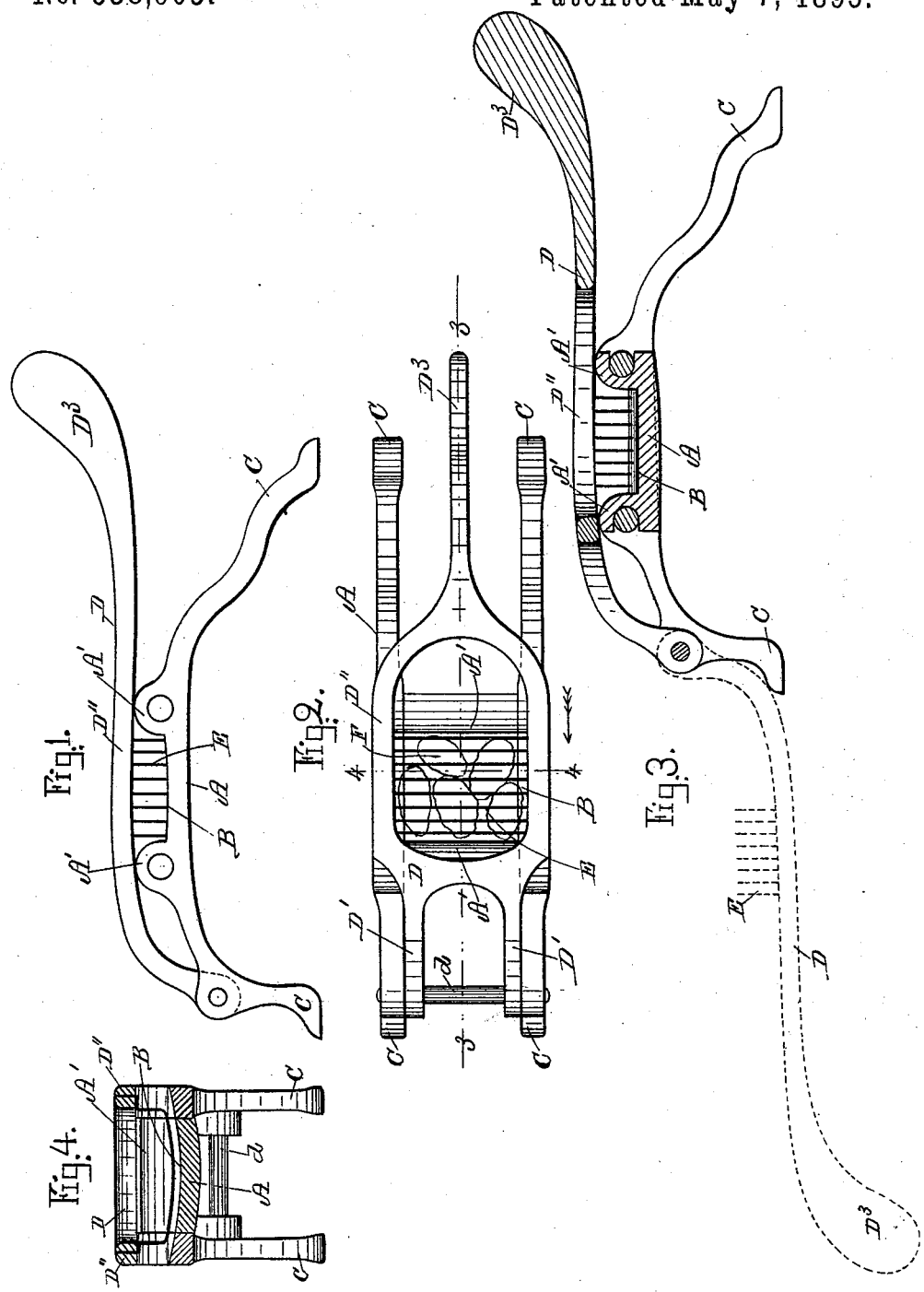
Witnesses
Inventor
Charles M. Fowler
THE NORRIS PETERS CO., PHOTO-LITHO., WASHINGTON, D. C.

UNITED STATES PATENT OFFICE.

CHARLES M. FOWLER, OF SPRINGFIELD, MASSACHUSETTS.

RAISIN-SEEDER.

SPECIFICATION forming part of Letters Patent No. 538,905, dated May 7, 1895.

Application filed February 11, 1895. Serial No. 537,893. (No model.)

*To all whom it may concern:*

Be it known that I, CHARLES M. FOWLER, a citizen of the United States, and a resident of Springfield, in the county of Hampden and State of Massachusetts, have invented new and useful Improvements in Raisin-Seeders, of which the following, taken in connection with the accompanying drawings, is a specification.

This invention relates to improvements in raisin seeders, and it is carried out as follows, reference being had to the accompanying drawings, wherein—

Figure 1 represents a side elevation of the invention. Fig. 2 represents a top plan view. Fig. 3 represents a longitudinal section on the line 3 3 in Fig. 2, showing in dotted lines the lever swung entirely away from the raisin-receptacle; and Fig. 4 represents a cross-section on the line 4 4 shown in Fig. 2.

Similar letters refer to similar parts wherever they occur on the different parts of the drawings.

In the drawings A represents the frame or bed piece having a recessed or concave bed B in which the raisin is placed during the seeding operation. The bed piece or frame is preferably provided with feet or legs C, C, adapted to rest on the table, bench, &c., as may be desired. To one end of the frame is pivoted at $d$ the seeder lever D having the pivoted end preferably made forked as shown at D', D', in Figs. 1, 2 and 3, and having a perforated middle portion D'' directly above the concave bed B as shown so as to enable the operator to see when the seeds are pressed out of the raisins; and said lever D is provided in its free end with a suitable handle $D^3$ for the operator to take hold of during the seeding operation.

To the under side of the seeder lever D is secured a series of wires E, E, which are arranged in parallel rows, the spaces between such seeder wires being a little less than the thickness of the seeds, and as such wires are springy and adapted to expand one from the other it will be seen that as the lever D is pressed downward upon the raisins F resting in the concave bed B, said wires E, E, are free to yield one from the other to permit the seeds to be pressed upward between said wires and to be retained on top of the latter leaving the raisins in the recessed or concave bed B free from seeds.

By having the bed B recessed or concaved as shown, the raisin is confined in proper place and prevented from slipping out from such bed during the seeding operation.

The frame or bed piece A is provided with upwardly projecting stop lugs A', A', which serve as stops against the under side of the lever D so as to prevent the seeder wires E, E, from contact with the concave bed B during the downward pressure of said lever D, thus preventing said wires from being bent or broken.

In using the device the raisins are placed in the concave bed B and the lever D swung downward to the position shown in the drawings, causing the wires E, E, to force the seeds from the raisins and leave such seeds on top of the wires E, E, from which they may easily be removed from time to time. By swinging the lever D backward more or less the now seeded raisins may easily be removed and replaced by another one to be seeded and so on during the seeding operation. For the purpose of removing the seeded raisins from the wires, to which they usually adhere, and for readily cleaning such wires from time to time, the said lever D may be swung completely backward to the position shown in dotted lines in Fig. 3.

The device is very simple in construction, easy of operation and by its use the raisins may easily be seeded, and during such seeding operation the operator can ascertain through the sight opening D'', in lever D, the very moment the seeds are forced out from between the wires E, E, thus preventing the raisins from being unduly compressed or injured during the seeding operation.

What I wish to secure by Letters Patent and claim is—

A raisin seeder consisting of a frame or bed piece A having a concave or recessed raisin receptacle B and having stop projections A', A', combined with a pivoted lever D having a sight opening D'' and a series of parallel wires E, E, adapted to force the seeds from the raisins substantially as and for the purpose set forth.

In testimony whereof I have signed my name to this specification, in the presence of two subscribing witnesses, on this 6th day of February, A. D. 1895.

CHARLES M. FOWLER.

Witnesses:
L. V. B. COOK,
GEORGE W. FAIRFIELD.